United States Patent
Nakata et al.

(10) Patent No.: US 6,685,377 B2
(45) Date of Patent: Feb. 3, 2004

(54) ARRANGEMENT OF BEARING AND BOX FOR BALL JOINT

(75) Inventors: Sheiiti Nakata, São Paulo (BR); Walter Takeo Yagyu, São Paulo (BR)

(73) Assignee: Dana Industrial S/A, Sao Paulo (BR)

( * ) Notice: Subject to any disclaimer, the term of this patent is extended or adjusted under 35 U.S.C. 154(b) by 4 days.

(21) Appl. No.: 10/053,735

(22) Filed: Jan. 24, 2002

(65) Prior Publication Data

US 2002/0150421 A1 Oct. 17, 2002

(30) Foreign Application Priority Data

Jan. 24, 2001 (BR) .............................................. 0100428

(51) Int. Cl.[7] .......................... F16C 11/06; F16C 11/00
(52) U.S. Cl. ........................ 403/135; 403/122; 403/134
(58) Field of Search .......................... 403/122, 50, 131, 403/133, 134, 135

(56) References Cited

U.S. PATENT DOCUMENTS

| | | | | |
|---|---|---|---|---|
| 3,052,477 A | * | 9/1962 | Parker | 277/635 |
| 3,423,114 A | * | 1/1969 | Gottschald | 403/51 |
| 4,220,418 A | * | 9/1980 | Kondo et al. | 403/76 |
| 4,714,368 A | * | 12/1987 | Sawada et al. | 403/132 |
| 5,044,811 A | * | 9/1991 | Suzuki et al. | 403/134 |
| 6,113,302 A | * | 9/2000 | Buhl | 403/133 |
| 6,164,829 A | * | 12/2000 | Wenzel et al. | 384/203 |
| 6,190,080 B1 | * | 2/2001 | Lee | 403/135 |
| 6,341,915 B1 | * | 1/2002 | Kammel | 403/135 |

OTHER PUBLICATIONS

U.S. Patent Application Publication US 2002/0031395 A1, Kim, Mar. 2002.*

* cited by examiner

Primary Examiner—Robert J. Sandy
Assistant Examiner—Ruth C. Rodriguez
(74) Attorney, Agent, or Firm—Liniak, Berenato & White

(57) ABSTRACT

A ball joint assembly having sealing caps made of elastomer enclosing openings at both extremities. One of the sealing caps is connected between the ball pin and an integral part of a bearing utilized in the ball joint shaped during the process of injection of the bearing. The integral part of the bearing being formed as an appendix those projects itself towards outside of the ball joint box. A second sealing cap is connected directly between the ball pin and an integral part of the ball joint box being an appendix thereof shaped during the stamping of the ball joint box. The sealing arrangement provides a perfect seal that prevents the entry of any impurity between the movable pieces and those of friction, of the ball joint.

12 Claims, 1 Drawing Sheet

ARRANGEMENT OF BEARING AND BOX FOR BALL JOINT

BACKGROUND OF THE INVENTION

1. Field of the Invention

This invention refers to an arrangement of a bearing and box for ball joints that are applied to connections that demand angular and rotating movement of two pieces, and particularly for application to the rear shaft of light automotive vehicles.

2. Background of the Related Art

Related art ball joints require a sealing system to prevent impurities such as dust, sand and water penetrate in its interior and affect its operation due to the premature wearing out of its components, which must possess between themselves the best possible conformation, as after the mounting of the assembly, there is applied a certain load of displacement on the movable pieces, which load is generated by the friction of these moving pieces between themselves. Consequently, the presence of impurities between the pieces under friction tends to cause a premature wearing out of the components, affecting the performance of the ball joint. The ball joints at disposal for this purpose, generally are composed by a pin with a spherical section, which is coupled to a bearing, single or split in two pieces, such assembly being mounted in the interior of a box that thereafter is provided with orifices through were the non-spherical parts of the ball pin and the bearing are projected, that are sealed by sealing caps attached to a metallic ring that, by its turn, is retained between the box and the bearing, so as to prevent the entry of any impurity. At the ends of the box there are provided apertures, through which are projected the non-spherical parts of the pin, called ball pin body, where one of the pieces that need angular and rotating movement it is to be fixed, being the other piece fixed to the ball joint box by means of a bar. Thus, both the angular and rotating movement provided between the ball pin and the ball joint box must attend the needs of the pieces that are connected therein. However, to prevent the entry of impurities in the interior of the ball joint, at the ends of the box, through where the ball pin bodies penetrate, the sealing system must be perfect and efficient, even more because it is at these places that the ball pin performs its angular and rotating movements relative to the box.

The state of the art anticipates providing these places with sealing caps that are made of elastomer, with the two ends open, one of larger diameter to be coupled to a metallic ring (or collar) provided at the external part of the box and the other end of smaller diameter to be coupled to the body of the ball pin. In relation to the coupling of the outside part of the box the fixing of the sealing cap is normally made by providing between the box and the bearing, internally, a metallic ring that projects itself from the inner of the box, where are placed and fixed the ends of larger diameter of the sealing caps, after which the same are overlapped by an elastic ring, also called tightening ring, the purpose of which is to fix the sealing cap on the ring fixed to the box and to prevent the entry of any impurity, and, in relation to the coupling of the ball pin body, there is anticipated a ring, commonly called sealing ring, which aims to firmly fix the sealing cap on the ball pin body preventing the entry of impurities, but not impairing its rotating movement.

This fixing system of the sealing cap to the metallic ring attached to the box, however, has proven itself to be ineffective in consequence of some undesirable effects, related not only to its assembling process on the system, but also mainly due to the very manufacturing difficulties of the metallic ring that demand progressive tools for stamping of the ring, substantially increasing the cost of the piece and, consequently, the final cost of the ball joint.

SUMMARY OF THE INVENTION

The present invention aims to eliminate the undesirable effects of the prior art by providing a system with an arrangement that suppresses the metallic ring and formats an end of the bearing, so that, during its manufacturing process by injection the end of the bearing is formatted with the same material utilized for its injection, projecting said end to the outside of the box and providing it with a format similar to that of the metallic ring utilized in the usual arrangements and allowing, in this way, to be fixed to this projection the extremity of larger diameter of one of the sealing caps. With the same objective, that is, to eliminate the metallic ring, one of the extremities of the ball joint box is formatted during its manufacturing process by stamping process, providing a format similar to that of the metallic ring in order that one may fix, on this projection, the extremity of larger diameter of the other sealing cap. Thus, one of the sealing caps is fixed directly to the projection of the bearing and in the opposite side of the ball joint, while the other sealing cap is fixed directly to the projection of the ball joint box.

BRIEF DESCRIPTION OF THE DRAWINGS

Now this invention will be described in detail, by showing the description of an example of embodiment that is illustrated in the attached drawing, in which.

DETAILED DESCRIPTION OF THE PREFERRED EMBODIMENT

Figure 1:
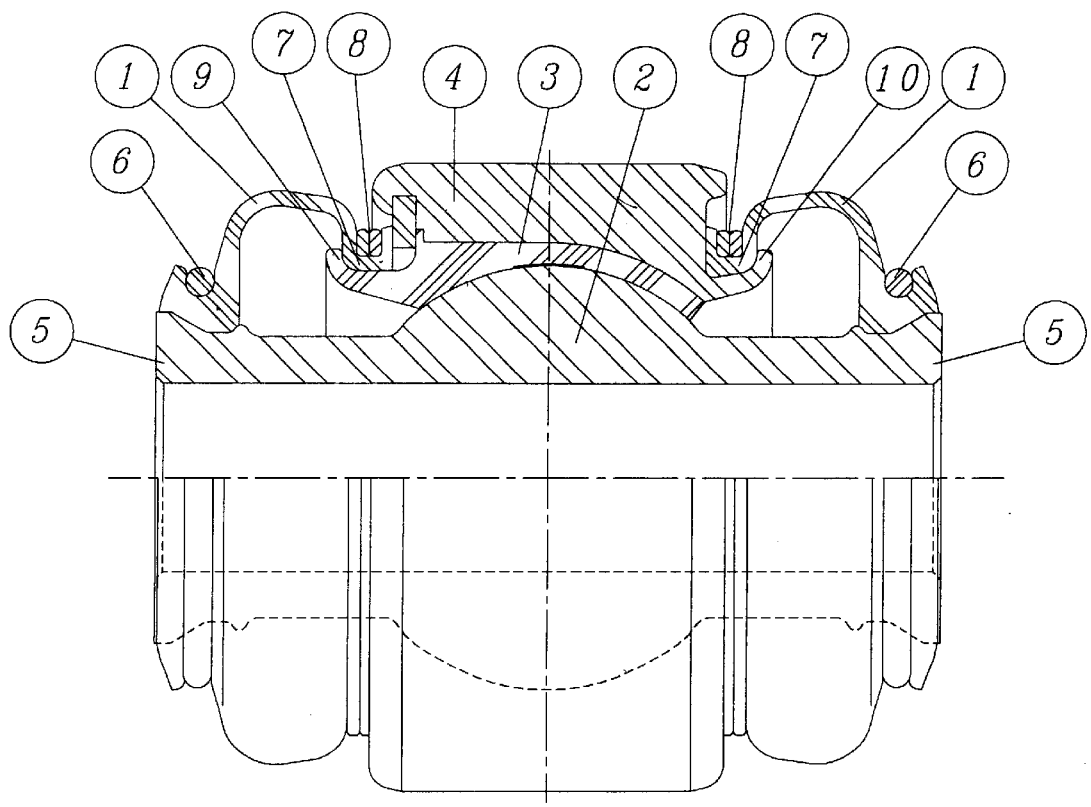
FIG. 1 shows the sealing caps coupled to the ball joint, represented in a partial longitudinal section.

The figure shows in the preferred embodiment of the invention, the sealing caps (1) for ball joint constituted by a pin with an spherical section (2), that is coupled to a bearing (3), manufactured as a solid part, being the assembly mounted in the interior of a box (4). The sealing caps (1) mounted on the non-spherical extremities (5) of the ball pin are provided on the openings of smaller diameter covering the body of the ball pin. A sealing ring (6) that provides the sealing at these extremities, preventing the entry of any impurity to the interior of the ball joint, but, guaranteeing the rotating movement desired for the ball pin. The sealing caps (1) are provided at their larger diameter opening (7) with a tightening ring (8), which purpose is of providing also at this extremity of the sealing cap (1), the sealing required to the system, preventing the entry of any impurities in the interior of the ball joint.

The housing, to which the larger diameter extremities (7) of the sealing caps (1) are fixed (7) and which in the prior art was constituted by the external part of a metallic ring manufactured through progressive stamping and attached by its internal part between the bearing (3) and the box (4), is arranged pursuant to this invention, at one of the sides of the ball joint, as an integral part (9) of the bearing (3), manufactured with the same material and constituted of an extension of the same, shaped during the process of injection of the bearing (3). Still within the scope of this invention, there is arranged on the other side of the ball joint, that is, on the side opposite to that where is fixed the sealing cap to the extension (9) of the bearing (3), another extension (10), now, in the very box (4) of the ball joint, formatted during the process of stamping of the box (4), that, by its turn will also make the role of the metallic ring utilized in the prior art, that is, to serve as a housing for the fixing of the larger diameter opening (7) of the sealing cap (1). This mixed arrangement, the purpose of which is to provide the housing of the sealing cap (1) of the ball joint through an extension (9) of the bearing (3) in one of the sides of the ball joint, and, on the opposite side of the same ball joint, to provide the housing of the other sealing cap (1) through an extension (10) in the very box (4) of the ball joint, has as purpose to allow the mounting of the assembly. This extension (9) has the same function as that of the metallic ring utilized in the prior art, but brings enormous advantages to the assembly, as it considerably reduces the final cost of the product by eliminating a piece, the metallic ring, that besides its intrinsic cost, still represents a high manufacturing cost, considering that it depends on progressive tools. Besides the considerable reduction of costs, the system according to this invention provides a great assembling easiness, as, being the housing of the larger diameter opening (7) of one of the sealing caps (1) an integral part of the bearing (3), and, on the opposite side of the ball joint, the other housing of the larger diameter opening (7) of the other sealing cap (1) an integral part of the very box (4) of the ball joint, the joint is already ready to receive the protection covers (1), without any other adjustments, being sufficient to lock the assembly, bearings (3) and box (4) with a simple ring.

While the foregoing invention has been shown and described with reference to a preferred embodiment, it will be understood by those possessing skill in the art that various changes and modifications may be made without departing from the spirit and scope of the invention.

What is claimed is:

1. A bearing and box arrangement for a ball joint comprising sealing caps made of elastomer having two extremities open, one being of larger diameter to be coupled to an external part of the box and another of smaller diameter to be coupled to a body of a ball pin, wherein a fixing housing is manufactured directly on the bearing and as an integral part thereof, and with the same material, having the shape of extension of the bearing provided in the interior of the box, turned outwards, to receive and fix an opening of larger diameter of one of the sealing caps providing a constant static sealing, in such a manner that said one of the sealing caps directly connects to said bearing element without engaging said box wherein on one of the sides of the ball joint, the housing for the fixing of the sealing cap is constructed as an extension of the bearing and with the same material thereof, during an injection process and, on the other side of the ball joint, the housing for the fixing of the other sealing cap is constructed as an extension of the box and with the same material thereof, during the stamping process in such a manner that said other sealing cap directly connects to said box without engaging said bearing element.

2. The arrangement of a bearing and box for a ball joint, according to claim 1, wherein the fixing housing of the sealing cap is constructed with the same material of the bearing and, shaped during the injection of the same, being a single piece, and projecting itself as an appendix of there from towards outside the box and being shaped as a housing for fixing the opening of the larger diameter of the sealing cap.

3. The arrangement of bearing and box for ball joint, according to claim 2, wherein a second housing of the opposite side of the bearing, made of the same material as the box during the same stamping process, receiving and fixing the opening of larger diameter of the other sealing cap, and providing a static and constant sealing.

4. The arrangement of bearing and box for ball joint according to claim 3, further comprising another housing of fixing of the sealing cap constructed with the same material of the box and shaped during a stamping process, constituting a single piece, with the purpose of taking the shape of a housing for fixing of the opening of larger diameter to the other sealing cap.

5. A ball joint assembly comprising:
   a ball pin extending between first and second ends, said ball pin having a spherical section intermediate said first and second ends;
   a ball joint box disposed about said spherical section of said ball pin: and
   a bearing element disposed between said ball joint box and said ball pin forming a connection between said ball joint box and said ball pin and facilitating a rotating and angular movement between said ball pin and said ball joint box; and
   a first sealing cap connecting one of said first and second ends of said ball pin and said ball joint box and being directly connected to said ball joint box; and
   a second sealing cap connecting another of said first and second ends of said ball pin and said bearing element and being directly connected to said bearing element without engaging the ball joint box.

6. The ball joint assembly according to claim 5, wherein said bearing element further comprises an extension integrally formed with said bearing element by an injection process, said second sealing cap being secured to said extension by an elastic tightening ring overlapping said second sealing cap and said extension of said bearing element.

7. The ball joint assembly according to claim 5, wherein said ball joint box further comprises an extension integrally formed therewith by a stamping process, said first sealing cap being secured to said extension of said ball joint box by an elastic tightening ring overlapping said first sealing cap and said extension.

8. The ball joint assembly according to claim 6, wherein said ball joint box further comprises an extension integrally formed therewith by a stamping process, said first sealing cap being secured to said extension of said ball joint box by an elastic tightening ring overlapping said first sealing cap and said extension.

9. A ball joint assembly comprising:
   a ball pin extending between first and second ends, said ball pin having a spherical section intermediate said first and second ends;
   a ball joint box disposed about said spherical section of said ball pin: and
   a bearing element disposed between said ball joint box and said ball pin forming a connection between said ball joint box and said ball pin and facilitating a rotating and angular movement between said ball pin and said ball joint box; and
   a first sealing cap connecting one of said first and second ends of said ball pin and said ball joint box and being directly connected to said ball joint box without engaging said bearing element; and
   a second sealing cap connecting another of said first and second ends of said ball pin and said bearing element and being directly connected to said bearing element.

10. The ball joint assembly according to claim 9, wherein said bearing element further comprises a first longitudinal extension portion homogeneously formed with said bearing element by an injection process and disposed adjacent a first end of said bearing element form an annular recessed seat portion in said first end of said bearing element, said second sealing cap being secured to said annular recessed seat portion formed in said first longitudinal extension portion by an elastic tightening ring overlapping said second sealing cap and said first longitudinal extension portion.

11. The ball joint assembly according to claim 9, wherein said ball joint box further comprises a second longitudinal extension portion homogeneously formed therewith by a stamping process, said second sealing cap being secured to an annular recess formed in said second longitudinal extension portion by an elastic tightening ring overlapping said second sealing cap and said second longitudinal extension portion.

12. The ball joint assembly according to claim 11, wherein said ball joint box further comprises a second longitudinal extension portion homogeneously formed therewith by a stamping process, said second sealing cap being secured to an annular recess formed in said second longitudinal extension portion by an elastic tightening ring overlapping said second sealing cap and said second longitudinal extension portion.

* * * * *